(12) United States Patent
Okajima

(10) Patent No.: US 7,290,839 B2
(45) Date of Patent: *Nov. 6, 2007

(54) BICYCLE RIM

(75) Inventor: Shinpei Okajima, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/442,264

(22) Filed: May 30, 2006

(65) Prior Publication Data

US 2006/0214499 A1    Sep. 28, 2006

Related U.S. Application Data

(63) Continuation of application No. 10/765,997, filed on Jan. 29, 2004, now Pat. No. 7,090,307, which is a continuation-in-part of application No. 10/430,396, filed on May 7, 2003, now Pat. No. 7,192,098.

(51) Int. Cl.
*B60B 25/00* (2006.01)

(52) U.S. Cl. .................. 301/95.107; 301/58

(58) Field of Classification Search .......... 301/55, 301/58–59, 61, 67, 104, 95.101, 95.104, 301/95.107, 95.108; 29/894.33, 894.331–894.333
See application file for complete search history.

(56) References Cited

U.S. PATENT DOCUMENTS

| 183,647 A | 10/1876 | Danford |
| 298,632 A | 5/1884 | Smith |
| 382,658 A | 5/1888 | Nickerson |
| 395,523 A | 1/1889 | Taylor |
| 399,453 A | 3/1889 | Warwick |
| 416,190 A | * 12/1889 | Terry ............................ 301/58 |
| 446,189 A | 2/1891 | Overman |
| 452,649 A | 5/1891 | Powell |
| 486,995 A | 11/1892 | Welnmann et al. |
| 521,385 A | 6/1894 | Mosley |
| 574,139 A | 12/1896 | Curry |
| 651,981 A | 6/1900 | Singer |
| 657,435 A | * 9/1900 | Minshall ..................... 301/67 |
| 737,007 A | 6/1903 | Newton |
| 804,617 A | 11/1905 | Newton |
| 1,212,803 A | 1/1917 | Murray |
| 1,286,065 A | 11/1918 | Murray |
| 1,316,605 A | 9/1919 | Wagenhorst |
| 1,367,092 A | 2/1921 | Porter |
| 1,451,911 A | 4/1923 | Porter |

(Continued)

FOREIGN PATENT DOCUMENTS

EP          0130449         1/1985

(Continued)

*Primary Examiner*—Jason R. Bellinger
(74) *Attorney, Agent, or Firm*—Global IP Counselors, LLP

(57) ABSTRACT

A bicycle rim is provided that includes a tire attachment portion, a spoke attachment portion and a plurality of reinforcement members. The spoke attachment portion is fixedly coupled with the tire attachment portion. The spoke attachment portion includes a plurality of circumferentially spaced attachment openings. The reinforcement members are fixedly coupled to the spoke attachment portion at the attachment openings to effectively increase the thickness of the spoke attachment portion of the rim at the attachment openings. Each of the reinforcement members is bonded to the spoke attachment portion. The through openings are aligned with the attachment openings.

13 Claims, 11 Drawing Sheets

U.S. PATENT DOCUMENTS

| | | |
|---|---|---|
| 1,469,769 A | 10/1923 | Booth |
| 1,484,844 A | 2/1924 | Olle |
| 1,584,576 A | 5/1926 | Wagenhorst |
| 1,635,849 A | 7/1927 | Isguerra |
| 1,649,678 A | 11/1927 | Freivogel |
| 1,676,303 A | 7/1928 | Wagenhorst |
| 1,722,855 A * | 7/1929 | Owen et al. .................. 301/67 |
| 2,937,905 A | 5/1960 | Altenburger |
| 4,583,787 A | 4/1986 | Michelotti |
| 4,793,659 A | 12/1988 | Oleff et al. |
| 5,110,190 A | 5/1992 | Johnson |
| 5,499,864 A | 3/1996 | Klein et al. |
| 5,651,591 A | 7/1997 | Mercat et al. |
| 5,806,935 A | 9/1998 | Shermeister |
| 5,829,299 A | 11/1998 | Wessels |
| 6,024,413 A * | 2/2000 | Dixon et al. ................... 301/58 |
| 6,155,651 A | 12/2000 | Mizata et al. |
| 6,213,562 B1 | 4/2001 | Muraoka et al. |
| 6,216,344 B1 | 4/2001 | Mercat et al. |
| 6,224,165 B1 | 5/2001 | Mercat et al. |
| 6,257,676 B1 * | 7/2001 | Lacombe et al. ............. 301/58 |
| 6,367,883 B1 | 4/2002 | Chen |
| 6,378,953 B2 | 4/2002 | Mercat et al. |
| 6,402,256 B1 | 6/2002 | Mercat |
| 6,431,658 B1 | 8/2002 | Nakajima et al. |
| 6,443,533 B2 | 9/2002 | Lacombe et al. |
| 6,568,766 B1 | 5/2003 | Okajima et al. |
| 6,715,844 B2 | 4/2004 | Dietrich |
| 6,736,462 B1 | 5/2004 | Okajima |
| 7,090,307 B2 * | 8/2006 | Okajima ................. 301/95.107 |
| 2002/0014293 A1 | 2/2002 | Passarotto |
| 2004/0222690 A1* | 11/2004 | Okajima ...................... 301/58 |
| 2004/0222691 A1 | 11/2004 | Okajima |

FOREIGN PATENT DOCUMENTS

| | | |
|---|---|---|
| EP | 0714791 | 6/1996 |
| EP | 0715001 | 6/1996 |
| EP | 1134096 | 9/2001 |
| EP | 1167078 | 1/2002 |
| EP | 1207053 | 5/2002 |
| EP | 1236586 | 9/2002 |
| EP | 1260382 | 11/2002 |
| EP | 1486352 | 12/2004 |
| JP | 639502 | 5/1994 |
| JP | 7501022 | 2/1995 |
| TW | 313981 | 8/1997 |

* cited by examiner

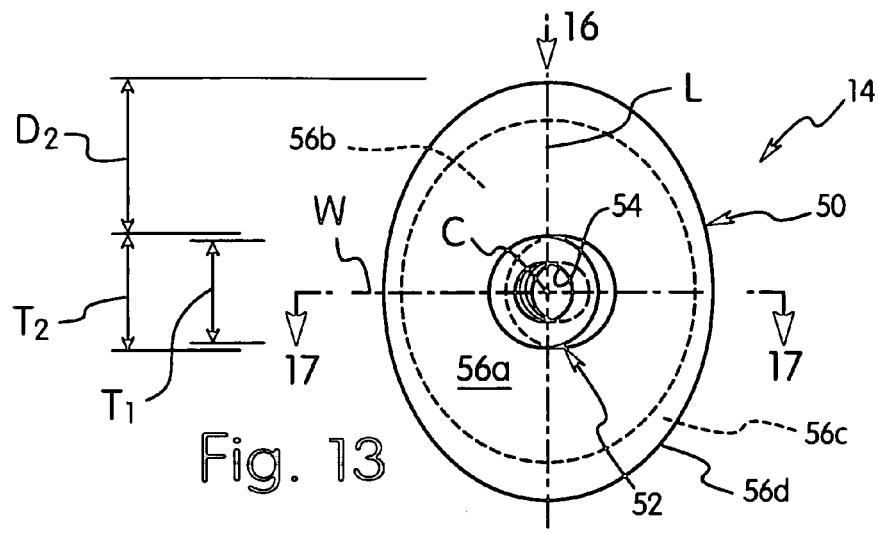
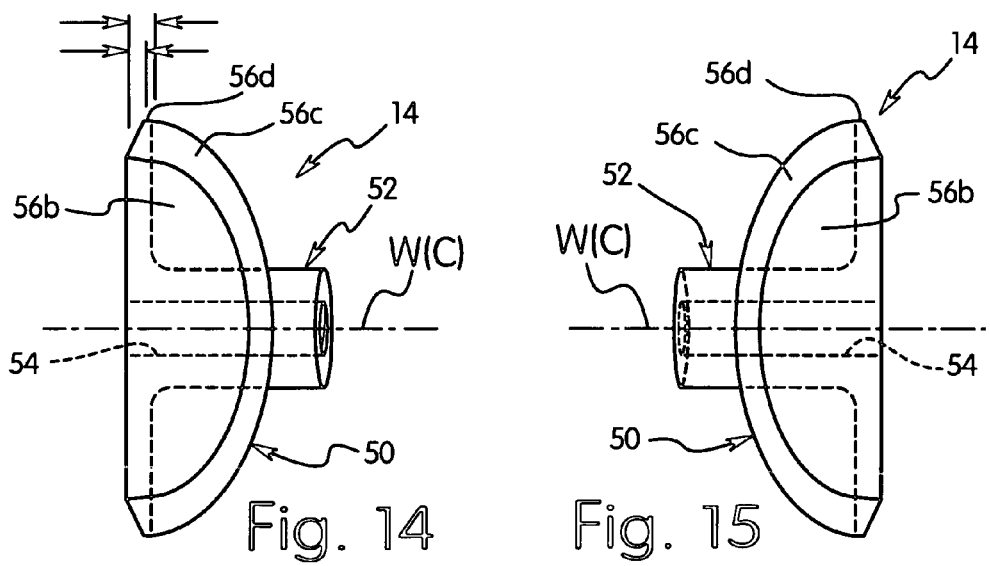
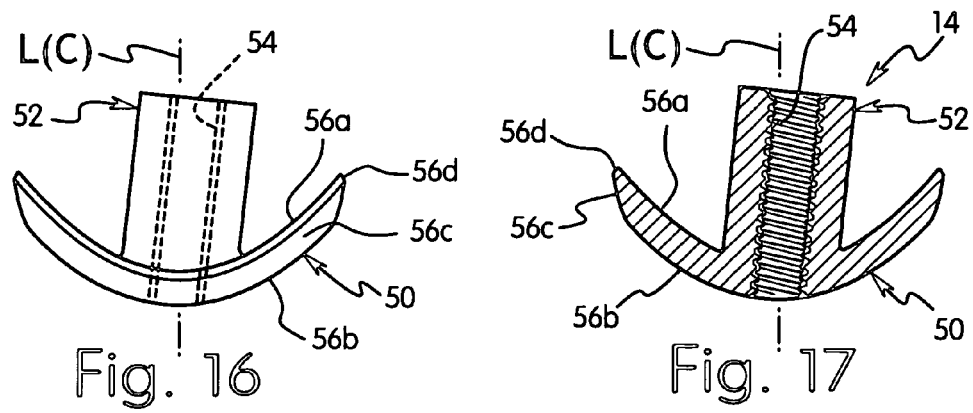

BICYCLE RIM

CROSS-REFERENCE TO RELATED APPLICATIONS

This application is a continuation application of U.S. patent application Ser. No. 10/765,997 filed on Jan. 29, 2004, now U.S. Pat. No. 7,090,307, which issued on Aug. 15, 2006, which is a continuation-in-part application of U.S. patent application Ser. No. 10/430,396 filed on May 7, 2003, now U.S. Pat. No. 7,192,098, which issued on Mar. 20, 2007. The entire disclosure of U.S. patent application Ser. Nos. 10/430,396 and 10/765,997 are hereby incorporated herein by reference.

BACKGROUND OF THE INVENTION

1. Field of the Invention

This invention generally relates to a bicycle wheel. More specifically, the present invention relates to a bicycle wheel having a reinforced rim.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the bicycle wheel. Bicycle wheels are constantly being redesigned to be strong, lightweight and more aerodynamic in design as well as to be simple to manufacture and assemble.

There are many different types of bicycle wheels, which are currently available on the market. Most bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are usually provided with flanges that are used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to holes in the rim.

The above types of wheels have been designed for use with tube tires or tubeless tires. Typically, tubeless tire wheels have an annular seal arranged to seal the spoke attachment openings of the rim. Rims designed for tube tires also often have an annular member covering the spoke attachments. In any case, these typical types of wheels can be expensive and complicated to manufacture and assemble. Moreover, these typical wheels are not always as strong and lightweight, as desired. Furthermore, with these typical wheels it can be difficult, complicated and/or expensive to replace a spoke or spokes.

In view of the above, it will be apparent to those skilled in the art from this disclosure that there exists a need for an improved bicycle rim for a bicycle wheel. This invention addresses this need in the art as well as other needs, which will become apparent to those skilled in the art from this disclosure.

SUMMARY OF THE INVENTION

One object of the present invention is to provide a bicycle wheel with a rim that is relatively strong yet relatively lightweight.

Another object of the present invention is to provide a rim that is relatively simple and inexpensive to manufacture and assemble.

The foregoing objects can basically be attained by providing a bicycle rim that includes an annular tire attachment portion, an annular spoke attachment portion and a plurality of reinforcement members. The annular tire attachment portion is adapted to have a tires mounted thereon. The annular spoke attachment portion is fixedly coupled with the tire attachment portion. The spoke attachment portion includes a plurality of circumferentially spaced attachment openings with each opening having a central axis extending therethrough. The reinforcement members are fixedly coupled to the spoke attachment portion at the attachment openings to effectively increase the thickness of the spoke attachment portion of the rim at the attachment openings. Each of the reinforcement members is bonded to the spoke attachment portion. Each reinforcement member has a base section including a rim facing surface, an exterior facing surface and a through opening. The rim facing surfaces contact an outer surface of the spoke attachment portion of the rim. The exterior facing surfaces face in an opposite direction from the rim facing surfaces. The through openings are aligned with the attachment openings.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which farm a part of this original disclosure:

FIG. 13 is an outside elevational view (i.e. outer radial view) of the reinforcement member illustrated in FIG. 12;

FIG. 14 is a side (axial) elevational view of the reinforcement member illustrated in FIGS. 12 and 13;

FIG. 15 is an opposite side (axial) elevational view of the reinforcement member illustrated in FIGS. 12-14;

FIG. 16 is an end (circumferential) elevational view of the reinforcement member illustrated in FIGS. 12-15, as viewed along arrow 16 of FIG. 13;

FIG. 17 is a cross-sectional view of the reinforcement member illustrated in FIGS. 12-16, as see along section line 17-17 of FIG. 13;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
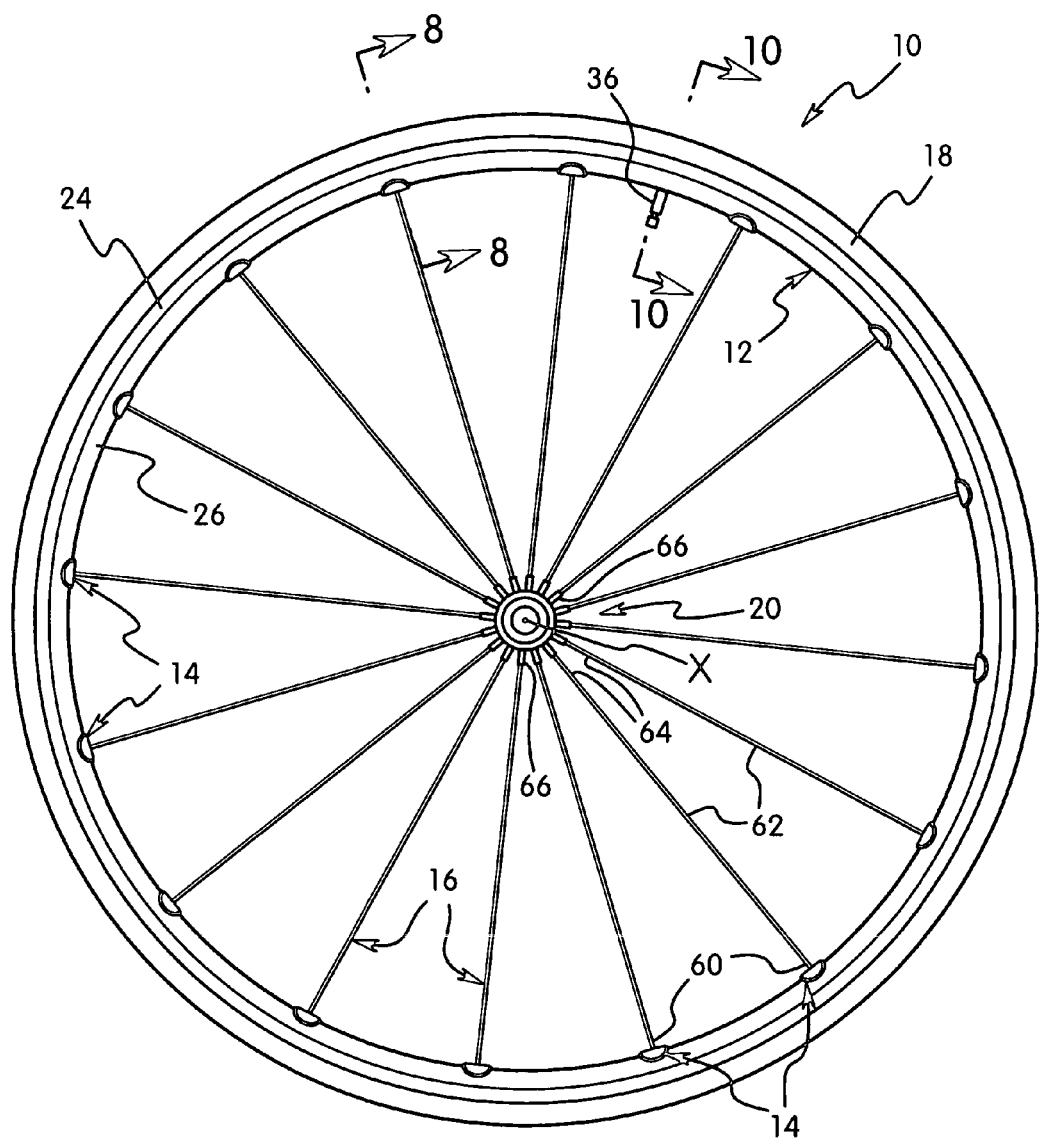
FIG. 1 is a side elevational view of a bicycle wheel with a reinforced rim in accordance with a first preferred embodiment of the present invention.
Figure 2:
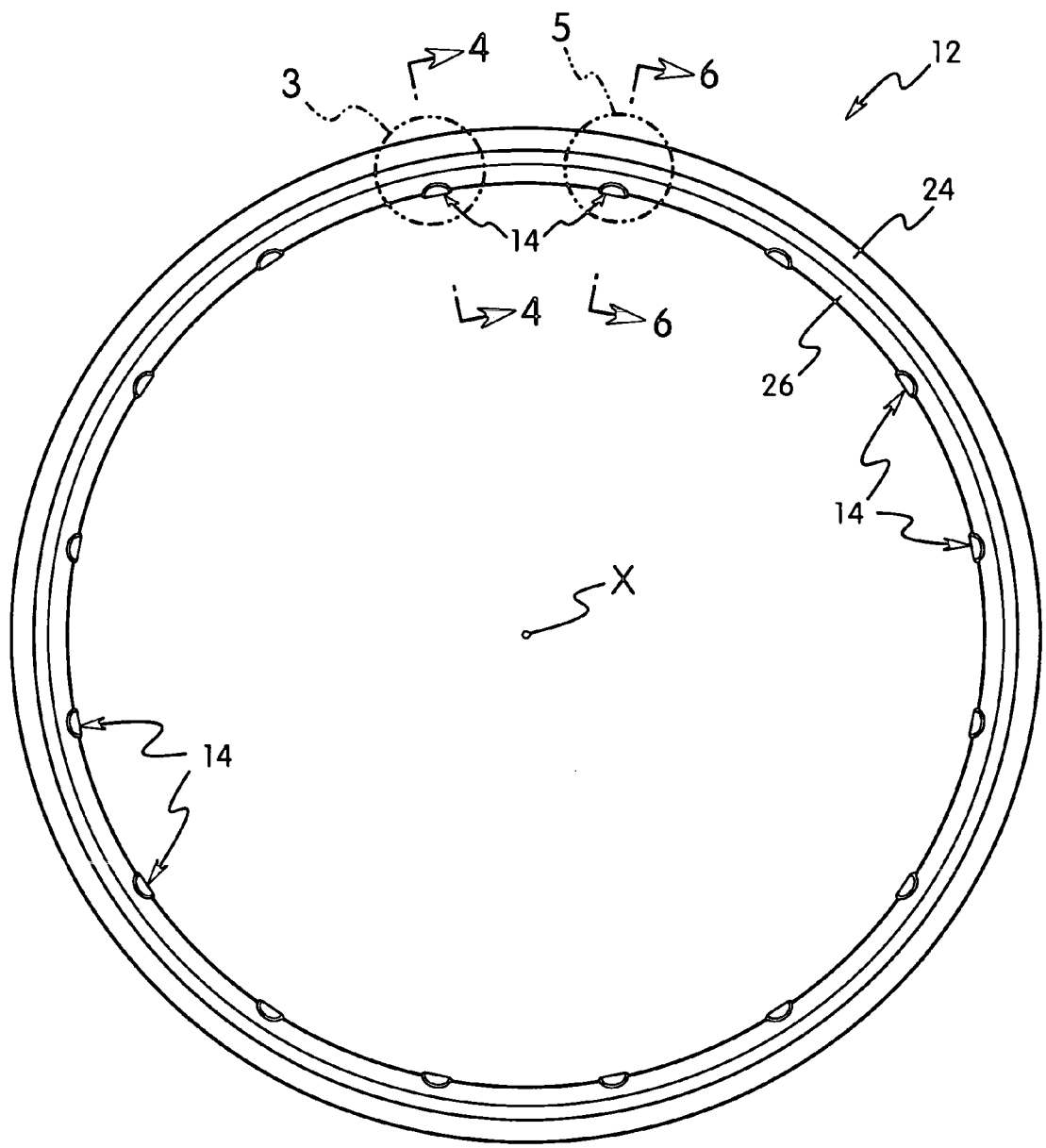
FIG. 2 is a side elevational view of the reinforced rim of the wheel illustrated in FIG. 1.

Referring initially to FIGS. 1 and 2, a bicycle wheel 10 is illustrated in accordance with a first preferred embodiment of the present invention. The bicycle wheel 10 utilizes a reinforced rim 12 that has a plurality of reinforcement members 14 fixedly coupled thereto in accordance with the present invention. When the reinforcement members 14 are fixedly coupled to the rim 12, the reinforcement members 14 form part of the rim 12. Thus, the bicycle wheel 10 basically includes the rim 12 with the reinforcement members 14, a plurality of spokes 16, a pneumatic tire 18 and a center hub 20. The tire 18 can include a tube (not shown) and a separate tire, or can be a tubeless type tire, as discussed below in more detail.

In the illustrated embodiment, the spokes 16 are radial spokes that connect the hub 20 to the rim 12. Also, in the illustrated embodiment, the hub 20 is a front hub (i.e. the hub 20 does not include one or more sprockets) that utilizes sixteen radial spokes 16 coupled to the rim 12 at equally spaced circumferential locations as seen in FIG. 1. Of course, it will be apparent to those skilled in the art from this disclosure that bicycle wheel 10 could use a modified rim and/or hub in order to accommodate different spoking arrangements (e.g. all tangential spokes, some tangential spokes and some radial spokes, etc.) without departing from the scope of the present invention. It will also be apparent to those skilled in the art from this disclosure that bicycle wheel 10 could use a modified rim and/or hub in order to accommodate one or more sprockets, as needed and/or desired. Moreover, it will be apparent to those skilled in the art from this disclosure that the bicycle wheel 10 could use a modified rim and/or hub in order to accommodate fewer or more spokes 16 if needed and/or desired. In any case, the spokes 16 are preferably coupled to the annular rim 12 in circumferentially spaced arrangement via the reinforcement members 14.

The rim 12 is an annular member designed for rotation about a center axis X. The rim 12 is constructed of a substantially rigid material, such as those materials, which are well known in the art. For example, the rim 12 can be constructed of any suitable metallic material, such as plated steel, stainless steel, aluminum, magnesium or titanium, as well as other non-metallic materials, such as a carbon fiber composite. Preferably, the rim 12 is constructed of aluminum. The construction of the rim 12 will be discussed in more detail below.

Referring to FIGS. 1-10, the rim 12 is substantially circular as seen in side elevation (FIGS. 1 and 2), and basically includes an outer annular portion 24, an inner annular portion 26 with a plurality of attachment openings 28, and the plurality of the reinforcement members 14 fixedly coupled to the inner annular portion 26 at the attachment openings 28 to reinforce the rim 12. The outer annular portion 24 is a tire attachment portion, while the inner annular portion 26 is a spoke attachment portion. Basically, the rim 12 has a uniform cross-sectional profile as seen in FIGS. 4, 6, and 8-10, except for the absence of material at various openings formed in the rim 12 as described herein.

Figure 8:
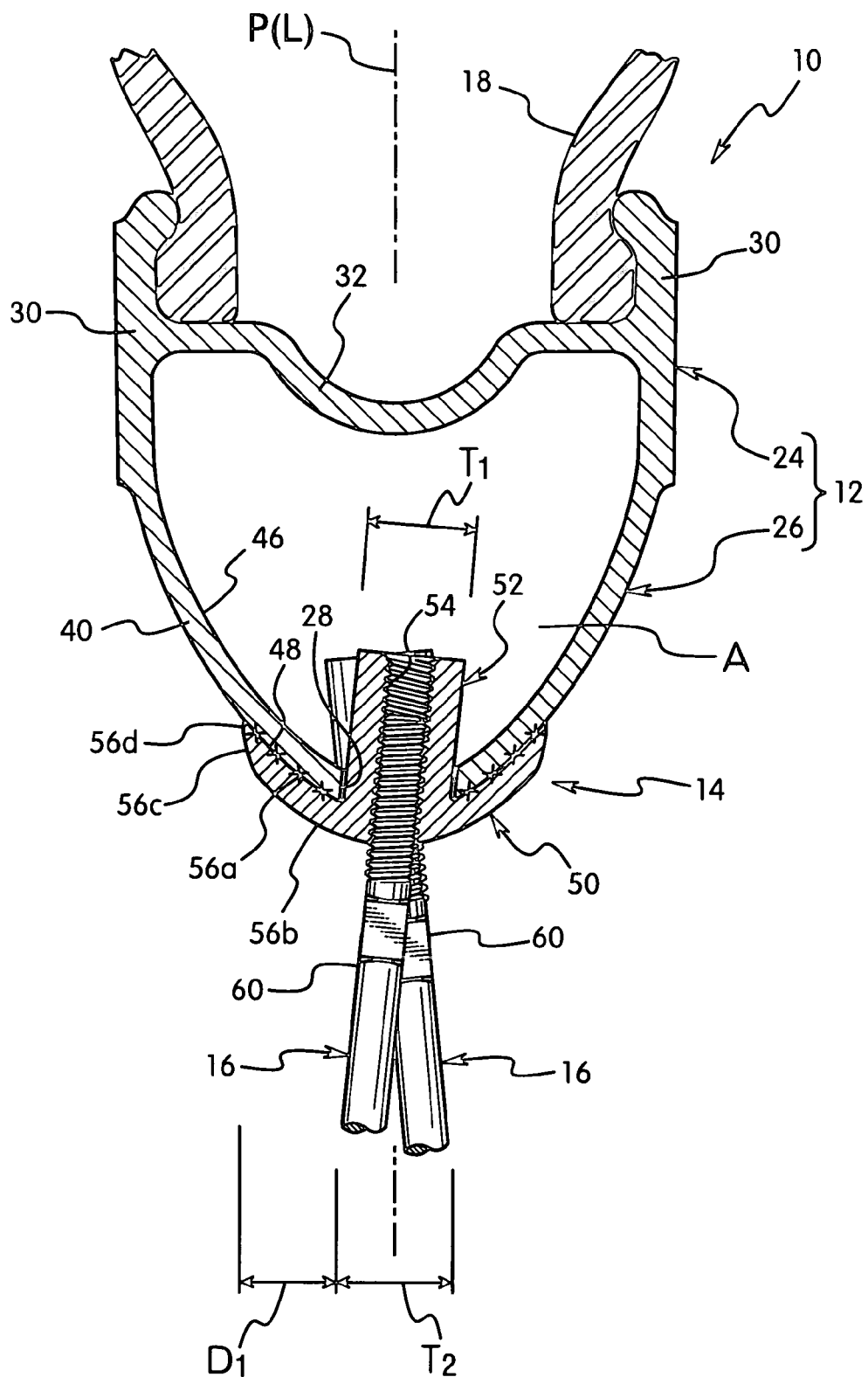
FIG. 8 is an enlarged, partial cross-sectional view of the bicycle wheel illustrated in FIG. 1, as seen along section line 8-8 of FIG. 1.
Figure 9:
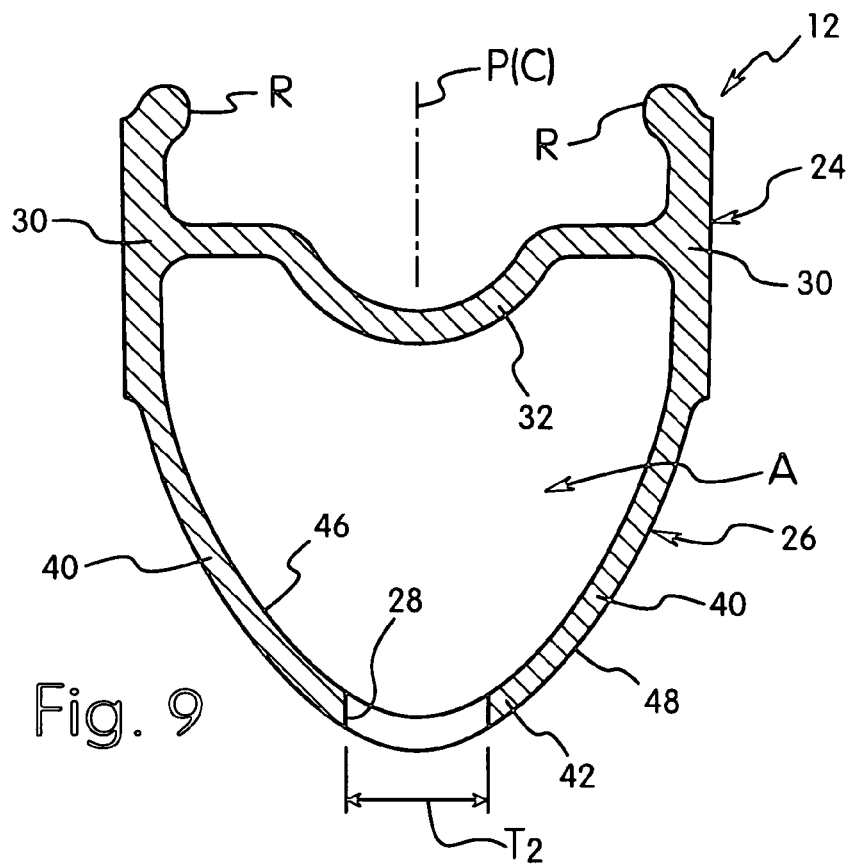
FIG. 9 is an enlarged, partial cross-sectional view of the bicycle wheel illustrated in FIG. 1, as seen along section line 8-8 of FIG. 1, with the tire, spokes and reinforcement members removed for the purpose of illustration.
Figure 10:
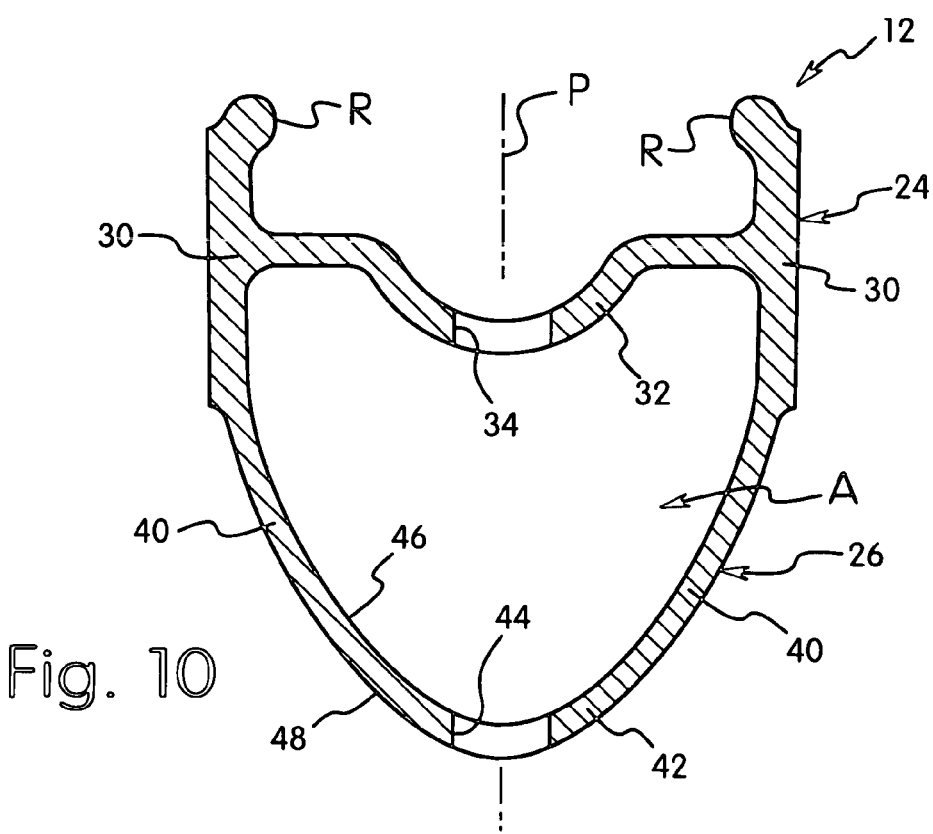
FIG. 10 is an enlarged, partial cross-sectional view of the bicycle wheel illustrated in FIGS. I and 8, as seen along section line 10-10 of FIG. 1, with the tire removed for the purpose of illustration.
Figure 11:
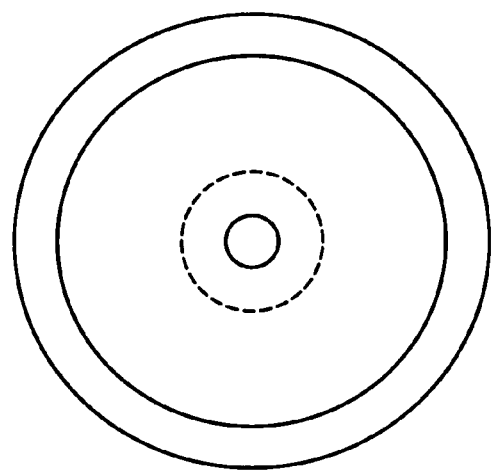
FIG. 11 is an enlarged inside elevational view (i.e. inner radial view) of a pre-formed reinforcement member prior to deforming the reinforcement member into the final desired shape to be mounted to the inner annular portion of the reinforced rim.
Figure 12:
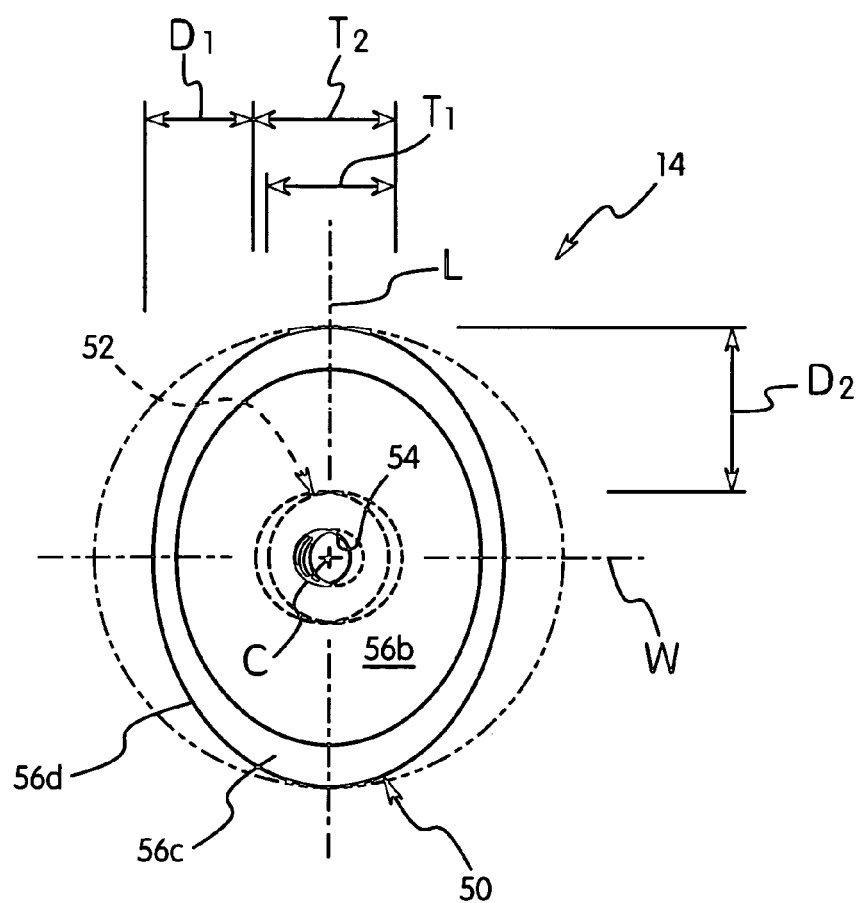
FIG. 12 is an enlarged inside elevational view (i.e. inner radial view) of one of the reinforcement members of the bicycle rim illustrated in FIGS. 1-8, after deforming the pre-formed reinforcement member illustrated in FIG. 11 into the final desired shape, with the pre-formed shape shown in phantom broken lines.
Figure 18:
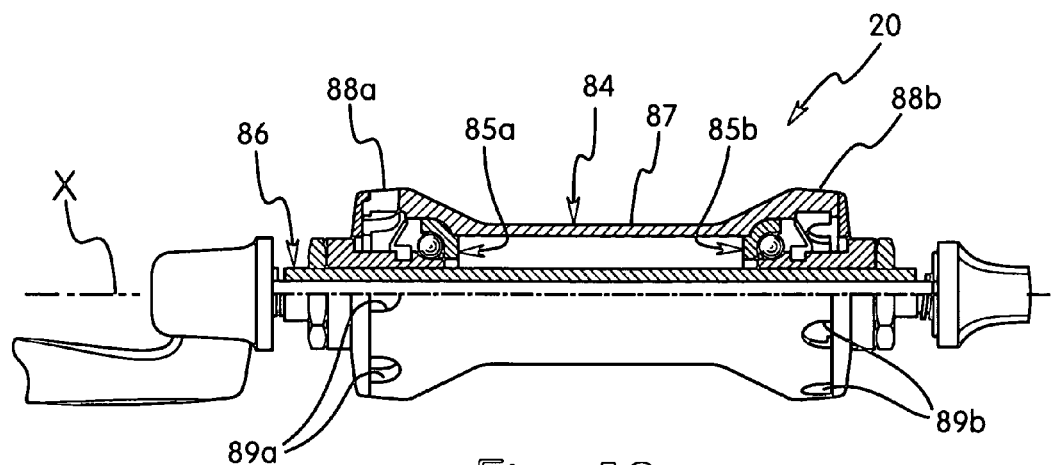
FIG. 18 is an enlarged, top plan view of the hub of the bicycle wheel illustrated in FIG. 1 with portions shown in cross-section for the purpose of illustration.
Figure 19:
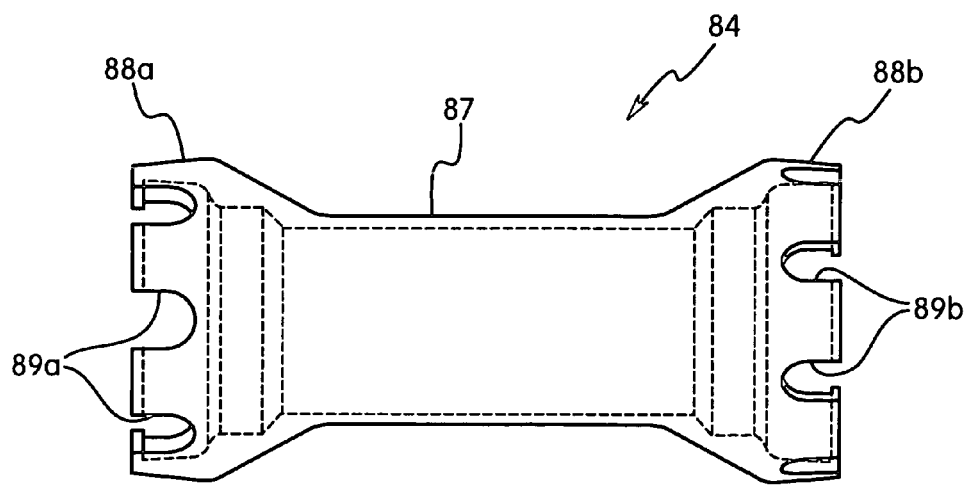
FIG. 19 is an enlarged, top plan view of the hub body of the hub illustrated in FIG. 18.
Figure 20:
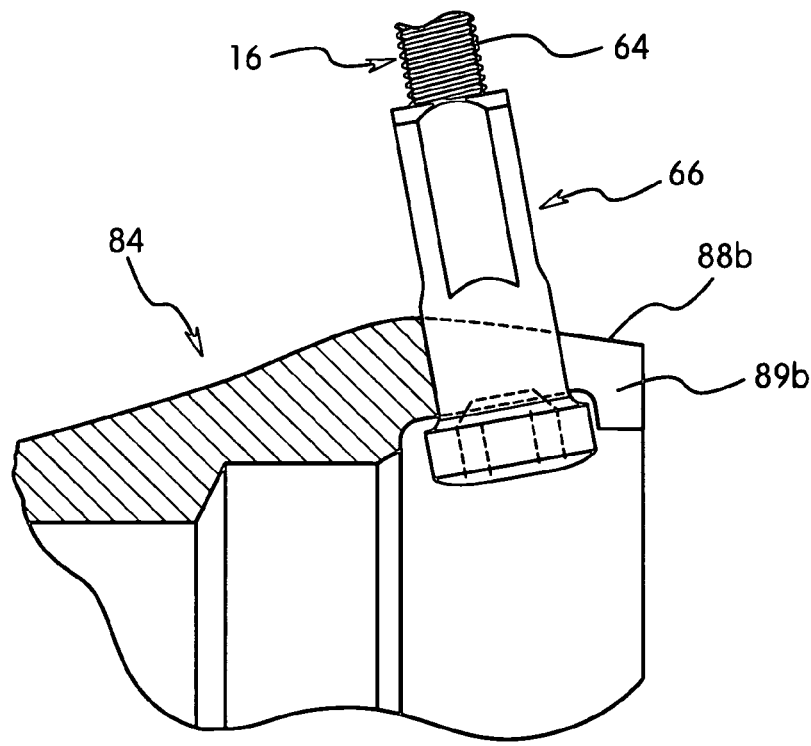
FIG. 20 is a partial, enlarged cross-sectional view of a portion of the hub body illustrated in FIGS. 18 and 19 with a spoke nipple arranged in a spoke hole.
Figure 21:
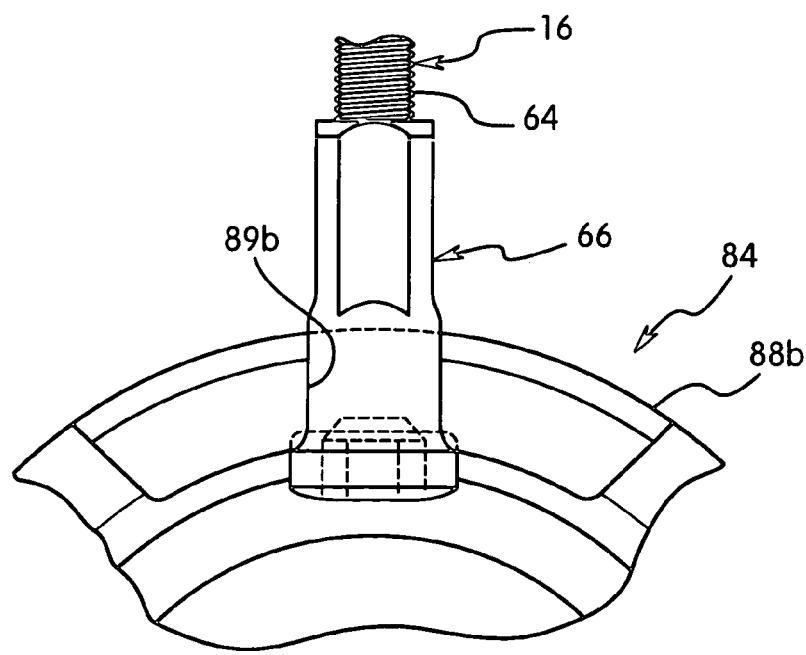
FIG. 21 is a right side elevational view of the portion of the hub body and spoke nipple illustrated in FIG. 20.
Figure 22:
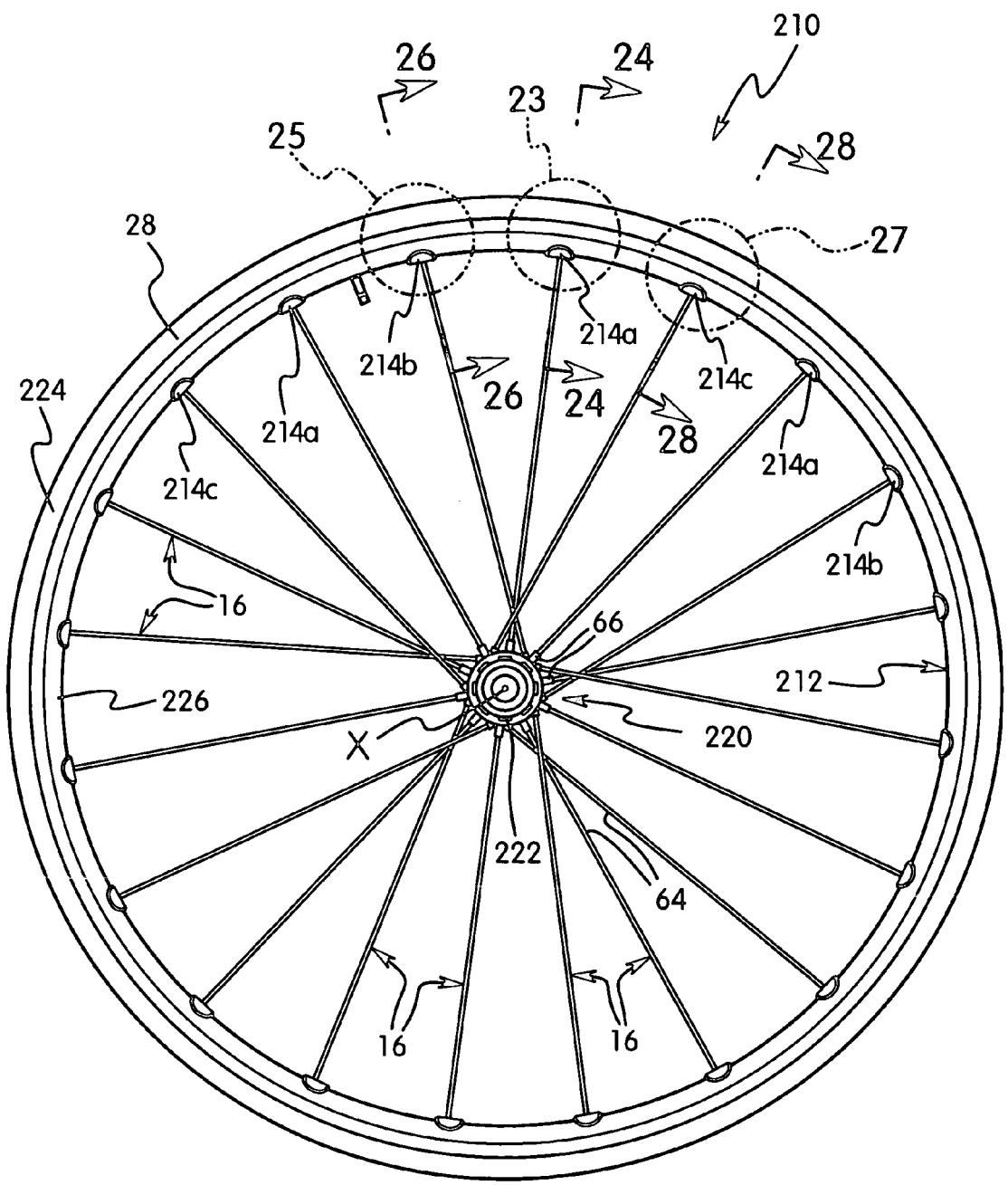
FIG. 22 is a side elevational view of a bicycle wheel with a reinforced rim in accordance with a second preferred embodiment of the present invention.
Figure 23:
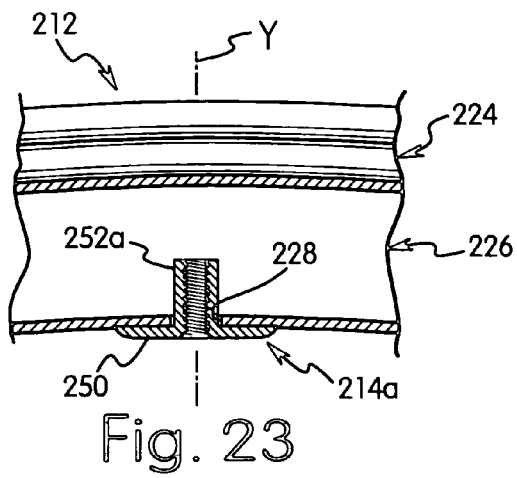
FIG. 23 is an enlarged, axial cross-sectional view of the area of the rim identified by circle 23 in FIG. 22 (i.e., a cross-sectional view as seen along the center plane of the wheel)

The inner annular portion 26 is fixedly coupled with the outer annular portion 24 to form an annular hollow area A, as best seen in FIGS. 8-10. The inner annular portion 26 preferably has a U-shaped cross-section with the ends of the U-shaped inner annular portion 26 coupled to opposite axial sides of the outer annular portion 24 to form the annular hollow area A. The outer annular portion 24 also preferably has a substantially U-shaped cross-section with the free ends of the substantially U-shaped outer annular portion designed to retain the tire 18.

The outer annular portion 24 and the inner annular portion 26 are preferably integrally formed together as a one-piece unitary aluminum member to form a constant cross-sectional shape about the entire circumference of the outer and inner annular portions 24 and 26 of the rim 12 in a relatively conventional manner. For example, the outer and inner annular portions 24 and 26 can be constructed by extruding a length of aluminum with the cross-sectional shape illustrated in FIGS. 8-10, then bending the length of aluminum into a circular shape, and then fixing (i.e., welding) the ends of the length of aluminum together. The attachment openings 28 can be punched or drilled in a conventional manner before or after welding the free ends of the length of aluminum together.

The reinforcement members 14 are preferably formed as separate aluminum members from the outer and inner annular portions 24 and 26 by casting, machining and/or any other suitable manufacturing technique to result in the initial shape illustrated in FIG. 10, and then by bending (i.e., deforming) them to the desired final shape illustrated in the remaining Figures. Alternatively, the reinforcement members 14 could be initially formed into the final shape by casting, machining and/or any other suitable manufacturing technique.

In either case, the reinforcement members 14 are then fixedly coupled to the inner annular portion 26 of the rim 12. Preferably, the reinforcement members 14 are bonded to the inner annular portion 26 by brazing or soldering in order to reinforce the rim 12, as discussed below in more detail. The outer and inner annular portions 24 and 26 each have a symmetrical cross-sectional shape relative to a center plane P that is perpendicular to the center axis X of the wheel 10. However, the rim 12 is not completely (i.e. not exactly or perfectly) symmetrical relative to the center plane P due to the arrangements of the reinforcement members 14, as discussed below in more detail. Thus, the rim 12 preferably has a substantially symmetrical shape relative to the center plane P of the wheel 10 when the reinforcement members 14 are coupled thereto. In other words, prior to fixedly coupling the reinforcement members 14 to the inner annular portion 26, the rim 12 is symmetrical.

Referring still to FIGS. 1-10, the outer annular portion 24 basically includes a pair of annular side sections or tire support sections 30 and an annular outer bridge or connecting section 32. The annular connecting section 32 extends between the annular side sections 30 to form a substantially U-shaped tire receiving recess as seen in cross-section as best seen in FIGS. 4, 6 and 8-10. The annular side sections 30 are annular plate shaped members that are preferably between about 1.1 and about 1.4 millimeters thick that form a pair of annular tire supporting surfaces and a pair of annular braking surfaces in a conventional manner.

The tire supporting surfaces of the annular side sections 30 are annular opposed planar annular surfaces that face each other toward the center plane P. The tire supporting surfaces have annular ribs R formed at their free ends to retain beads of the tire 18 in a conventional manner. The annular ribs R project axially toward each other. The annular braking surfaces of the annular side sections 30 are annular opposed planar annular surfaces that face outwardly away from the center plane P to engage conventional rim brakes. The radially inner ends of the annular side sections 30 are fixedly coupled to the inner annular portion 26.

The annular connecting section 32 is a tubular member that has a substantially constant thickness of about 0.9 millimeters. The annular connecting section 32 preferably has a varying, contoured shape, as best shown in FIGS. 8-10 to assist in mounting a tubeless tire thereto. The annular connecting section 32 preferably includes a single valve aperture 34 formed therein for coupling a valve 36 therein in a conventional manner, as seen in FIGS. 1 and 10. The annular connecting section 32 is fixedly coupled to the annular side sections 30 at radial positions between the inner and outer ends of the annular side sections 30. Preferably, the connecting section 32 is free of openings, except for the single valve aperture 34 such that the tire 18 can be a tubeless tire.

Of course, it will be apparent to those skilled in the art from this disclosure that the tire 18 could be a tube-type tire (not shown), and that the valve aperture 34 could receive the valve of a tube (not shown) in a conventional manner. Thus, the valve aperture 34 and/or the valve 36 can be designed for a tubeless tire in a conventional manner, and/or for a tube-type tire in a conventional manner. In any case, because the valve 36 is conventional, the valve 36 will not be discussed and/or illustrated in detail herein.

Referring still to FIGS. 1-10, the inner annular portion 26 is a curved tubular member that has a U-shaped or V-shaped cross-sectional shape. The inner annular portion 26 preferably has a constant thickness of about 0.8 millimeters. The inner annular portion 26 basically includes a pair of annular slanted sections 40 and an inner annular section 42 fixedly coupled to the slanted sections 40. The annular slanted sections 40 and the inner annular section 42 of the inner annular portion 26, and the annular side sections 30 and annular connecting section 32 of the outer annular portion 24 are preferably integrally formed together as a one-piece, unitary member that is separate from the reinforcement members 14.

The plurality of attachment openings 28 are formed in the inner annular section 42 and are designed to have the spokes 16 mounted therein via the reinforcement members 14. Outer radial ends of the slanted sections 40 are fixedly coupled to inner radial ends of the annular side sections 30 of the outer annular portion 24. Inner radial ends of the slanted sections 40 are fixedly coupled to outer radial ends of the inner annular section 42. The attachment openings 28 of the inner annular section 42 are preferably identical, circular-shaped openings with their central axes C extending in the radial direction along the center plane P. The inner annular section 42 preferably has sixteen (16) of the attachment openings 28 arranged in a circumferentially equally spaced manner from each other about the entire circumference of the rim 12.

The inner annular section 42 preferably includes a single valve opening 44 formed therein for coupling the valve 36 thereto in a conventional manner, as seen in FIGS. 1 and 10. The valve 36 is preferably designed such that the tire 18 can be a tubeless tire, as mentioned above. However, it will be apparent to those skilled in the art from this disclosure that the tire 18 could be a tube-type tire (not shown), and that the valve opening 44 could receive the valve of a tube (not shown) in a conventional manner. Thus, the valve opening 44 and/or the valve 36 can be designed for a tubeless tire in a conventional manner, and/or for a tube-type tire in a conventional manner.

The inner annular section 42 together with the annular slanted sections 40 define annular curved interior and exterior surfaces 46 and 48 of the inner annular portion 26. The reinforcement members 14 are preferably fixedly coupled to the exterior surface 48 by brazing or soldering such that the reinforcement members 14 are bonded to the exterior surface 48 of the inner annular portion 26. The attachment openings 28 extend between the interior and exterior surfaces 46 and 48 of the inner annular portion 26. Brazing is diagrammatically illustrated in FIG. 8 by "X". The attachment openings 28 are preferably identical to each other. Moreover, the attachment openings 28 are arranged and configured (i.e., sufficiently wide) so that the reinforcement members 14 can be arranged therein in an alternating angled arrangement such that the spokes 16 extend to opposite ends of the hub 20.

Referring now to FIGS. 1-17, the reinforcement members 14 will now be discussed in more detail. As mentioned above, the reinforcement members 14 are preferably identical members that are bonded to the exterior surface 48 of the inner annular portion 26 in order to permanently secure the reinforcement members 14 thereto. Each reinforcement member 14 is preferably constructed as a one-piece unitary member from a lightweight, rigid metallic material. Specifically, each reinforcement member 14 is preferably constructed of aluminum, as mentioned above. In any case, the reinforcement members 14 are preferably constructed of the same material as the outer and inner annular portions 24 and 26, and are permanently bonded (e.g., by brazing or soldering) to the inner annular portion 26 to reinforce the rim 12. The reinforcement members 14 effectively increase the thickness of the inner annular portion 26 at the attachment openings 28 to provide rigid reinforcement to the rim 12.

In other words, the reinforcement members 14 are bonded to the inner annular portion 26, preferably utilizing a brazing or soldering metal (not shown) as the bonding agent. When the reinforcement members 14 are brazed or soldered to the inner annular portion 26, a brazing or soldering metal, such as those well known in the bicycle art, is used that is different than the material of the reinforcement members 14 and the inner annular portion 26. Preferably, the brazing or soldering material is a metallic material with a lower melting point than the material of the reinforcement members 14 and the inner annular portion 26. For example, a brazing/soldering metal with a melting point of about 300° Celsius is preferable for attaching the reinforcement members 14. This temperature is a lower temperature than that typically required for welding, when two rigid metals are fused together.

While brazing or soldering with a metal brazing/soldering bonding material is a preferable attachment method for the rim 12 of the present invention, it will be apparent to those skilled in the art from this disclosure that other bonding techniques can be utilized as needed and/or desired. For example, the reinforcement members 14 could be bonded to the inner annular portion 26 with adhesive or a cementing agent (e.g., other than metal), instead of a brazing/soldering metal.

In this embodiment, each of the reinforcement members 14 has a substantially inverted mushroom shape as best shown in FIGS. 12-17. All of the reinforcement members 14 are preferably identical to each other. Thus, only one of the reinforcement members 14 will be discussed and/or illustrated in detail herein. However, the reinforcement members 14 are preferably mounted in an alternating orientation in alternating attachment openings 28 such that the spokes 16 extend to the appropriate ends of the hub 20, as best seen in FIGS. 1, 2, 3 and 5. As mentioned above, the reinforcement members 14 a pre-formed into the shape illustrated in FIG. 11 with a flat base and a tubular section perpendicular to the flat base. The pre-formed shape is then deformed into the desired final shape with a curved base section and an angled tubular section, as explained herein.

Specifically, each reinforcement member 14 basically includes a base section 50, a tubular section 52 extending from the base section 50 and a through opening 54 extending through both the base section 50 and the tubular section 52, as best seen in FIGS. 12-17. One end of one of the spokes 16 is coupled within the through opening 54 to couple the rim 12 to the hub 20. Specifically, the through opening 54 is preferably an internally threaded opening in order to threadedly couple one of the spokes 16 thereto. Thus, one of the spokes 16 can be adjustably, releasably coupled to the rim 12 via each reinforcement member 14.

The base section 50 is an elongated plate that preferably has a rim facing surface 56*a* and an exterior facing surface 56*b*. The base section 50 is curved as viewed in radial cross-section, as best seen in FIGS. 16 and 17. The base section 50 preferably has a symmetrical shape as viewed in the radial direction relative to a center longitudinal plane L and relative to a center transverse plane W, as best seen in FIGS. 12-17. The base section 50 is substantially oval-shaped. The rim facing surface 56*a* is a contoured surface that corresponds to the contour of the exterior surface 48 of the inner annular portion 26. The exterior facing surface 56*b* has a contour substantially the same as the rim facing surface 56*a*, except that the exterior facing surface 56*b* tapers toward the rim facing surface 56*a* at the outer periphery of the base section 50.

Specifically, the base section 50 preferably includes a tapered surface 56*c* extending around the outer periphery of the base section 50 to an outer peripheral edge surface 56*d* (i.e. a radial part that extends substantially radially). The base section 50 preferably has a maximum thickness of about 1.0 millimeters that tapers to a minimum thickness of about 0.3 millimeters to form the annular outer peripheral edge surface 56*d*, as best seen in FIGS. 8, 14 and 16. Thus, the tapered surface 56*c* (i.e., a tapered part) tapers about 0.7 millimeters as it approaches the edge surface 56*d*. In any case, the peripheral edge surface 56*d* is defined by the rim facing surface 56*a* and the tapered surface 56*c* of the base section 50, and is about 0.3 millimeters thick (i.e., about 30% of the maximum thickness of the base section 50). Furthermore, the outer peripheral edge surface 56*d* defines a step between the base section 50 and the outer surface 48 of the inner annular portion 26 when the reinforcement members 14 are fixed to the inner annular portion 26. Thus, the thickness of the base section 50 is substantially uniform, except at the outer periphery of the base section 50.

During attachment of each reinforcement member 14 to the inner annular portion 26, the brazing/soldering metal (not shown) is melted to bond the rim facing surface 56*a* of the reinforcement member 14 to the exterior surface 48 of the inner annular portion 26. Thus, after melting the brazing/soldering metal, a very thin bonding layer (not shown) fixedly couples the reinforcement member 14 together with the inner annular portion 26.

Figure 3:
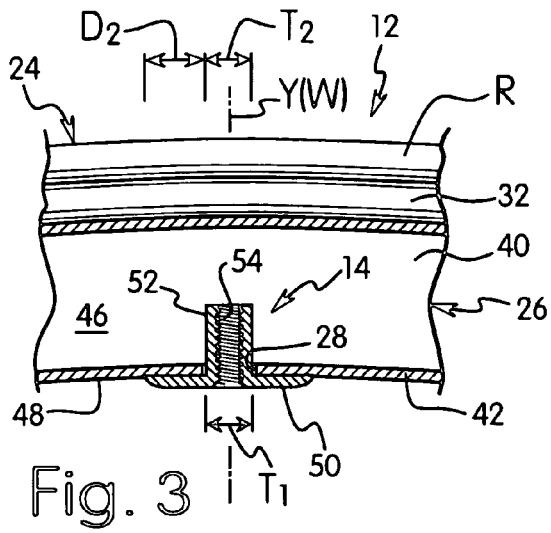
FIG. 3 is an enlarged, axial cross-sectional view of the area of the reinforced rim identified by circle 3 in FIG. 2 (i.e., across-sectional view as seen along the center plane of the wheel)
Figure 4:
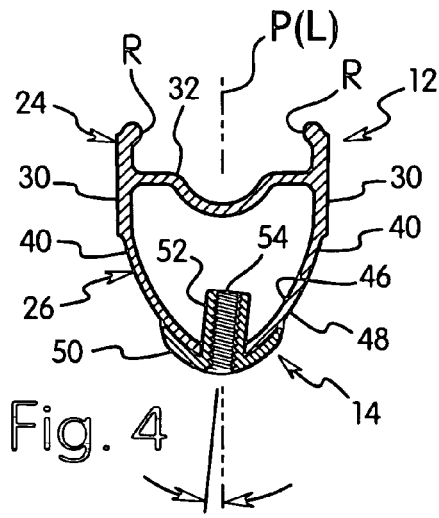
FIG. 4 is an enlarged, partial cross-sectional view of the reinforced rim illustrated in FIGS. 1-2, as viewed along section line 4-4 of FIG. 2.
Figure 5:
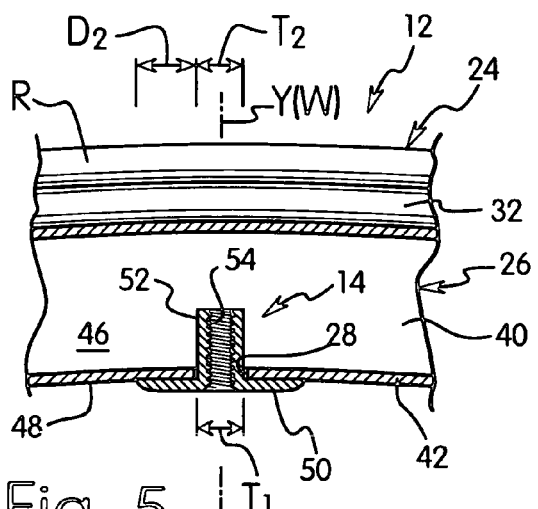
FIG. 5 is an enlarged, axial cross-sectional view of the area of the reinforced rim identified by circle 5 in FIG. 2 (i.e., across-sectional view as seen along the center plane of the wheel)
Figure 6:
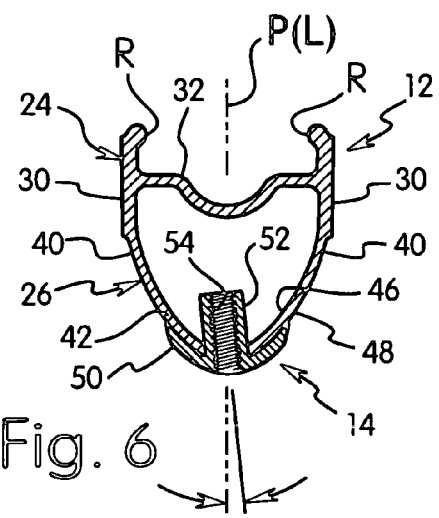
FIG. 6 is an enlarged, partial cross-sectional view of the reinforced rim illustrated in FIGS. 1-2, as viewed along section line 6-6 of FIG. 2.
Figure 7:
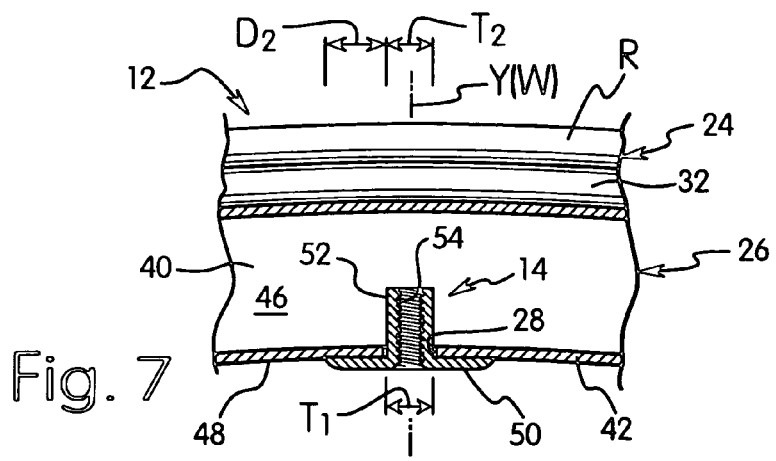
FIG. 7 is an enlarged, axial cross-sectional view of the area of the reinforced rim identified by circle 3 in FIG. 2 (i.e., across-sectional view as seen along the center plane of the wheel), with the cross-hatching removed for the purpose of illustration.

The tubular section 52 of each reinforcement member 14 extends from the base section 50 into one of the attachment openings 28. The tubular section 52 of each reinforcement member 14 is preferably angled about 6° relative to the center plane P and the longitudinal plane L in an alternating manner when mounted in one of the attachment openings 28 so that the spokes 16 extend to the appropriate ends of the hub 20. Thus, the tubular section 52 of each reinforcement member 14 preferably has a slightly smaller diameter $T_1$ (i.e., preferably about 4.3 millimeters) than the attachment openings 28 in order to accommodate the alternating angled arrangement of the spokes 16, and thus, the tubular sections 52 of the reinforcement members 14. The attachment openings 28 preferably have a diameter $T_2$ of at least about 5.0 millimeters in order to accommodate the alternating angled tubular sections 52 of the reinforcement members 14. The tubular section 52 of each reinforcement member 14 is preferably angled about 0° relative to a radial line Y as best seen in FIGS. 3, 5 and 7. The rim 12 has a plurality of radial lines Y extending outwardly from the rotation axis X through the centers of the reinforcement members 14.

However, opposite axial ends of the base section 50 are preferably arranged at the same radial position when the tubular section 52 is received in one of the attachment openings 28. Thus, each reinforcement member 14 is not perfectly or exactly symmetrical relative to the center plane P, which coincides with the center longitudinal plane L of the reinforcement member 14, as best seen in FIGS. 8 and 12-17. In other words, even though the base section 50 of each reinforcement member 14 is symmetrically shaped relative to the planes L and P, the reinforcement members 14 are not perfectly symmetrical relative to these planes due to the angled arrangement of the tubular sections 52.

Of course, it will be apparent to those skilled in the art from this disclosure that reinforcement members could be constructed that are completely symmetrical relative to the longitudinal plane L, if the attachment openings 28, the exterior surface 48 and the rim facing surface 56a are configured to such that the entire reinforcement members could be angled slightly relative to the center plane (i.e. offset slightly to opposite sides of the center plane in an alternating manner) of the rim within such attachment openings such that the spokes 16 extend to opposite ends of the hub 20. In such an arrangement, the attachment openings of the rim would be slightly larger.

As best seen in FIGS. 3, 5, 7, 8, 12 and 13, each of the reinforcement members 14 has a first overlapping dimension $D_1$ and a second overlapping dimension $D_2$ corresponding to the minimum and maximum amounts of overlap of the reinforcement members 14 with the inner annular portion 26. The first and second overlapping dimensions $D_1$ and $D_2$ are measured in a direction transverse to a center axis C of each of the attachment openings 28. More specifically, the first and second overlapping dimensions $D_1$ and $D_2$ are preferably measured substantially in the axial and circumferential directions, respectively, relative to the rim 12. Thus, the actual overlapping dimension of the reinforcement member 14 with the inner annular portion 26 varies between the first and second overlapping dimensions $D_1$ and $D_2$. The center axis C is angled relative to the center of the tubular section 52, as best seen in FIGS. 16 and 17. This overlapping arrangement of the reinforcement members 14 with the inner annular portion 26 aids in dispersing the stresses on the rim 12 from the spokes 16.

Each of the attachment openings 28 has maximum transverse dimension $T_2$. The first overlapping dimension $D_1$ is preferably larger than one-half of the maximum transverse dimension T, while the second overlapping dimension $D_2$ is preferably larger than the maximum transverse dimension or diameter $T_2$. In any case, the second (maximum) overlapping dimension $D_2$ is at least larger than one-half of the maximum transverse dimension $T_2$.

Referring now to FIGS. 1, 2, 8 and 18-21, the spokes 16 and the hub 20 will now be discussed in more detail. The spokes 16 are preferably identical to each other. Each of the spokes 16 basically includes an outer end portion 60, a center or a middle portion 62, an inner end portion 64 and a spoke nipple 66. The outer end portion 60, the center portion 62, and the inner end portion 64 of each spoke 16 are preferably integrally formed together as a one niece, unitary member. The spoke nipples 66 are preferably formed as separate members.

Each of the outer end portions 60 of the spokes 16 has external threads to engage one of the threaded through bores 54 of one of the reinforcement members 14, while each of the inner end portions 64 of the spokes 16 preferably has external threads with one of the spoke nipples 66 threadedly coupled thereto. The outer end of each spoke also has a square section used to rotate the spokes 16. The spokes 16 are placed under tension between the hub 20 and the annular rim 12 by rotating the spoke nipples 66 and/or the spokes 16 in a relatively conventional manner. The spokes 16 are preferably conventional wire-type spokes. Thus, the spokes 16 will not be discussed and/or illustrated in detail herein except as related to the rim 12 of the present invention.

Referring to FIGS. 18-21 he connections of the spokes 16 to the hub 20 will now be discussed in more detail. The connections of the spokes 16 to the hub 20 are basically identical to the connections disclosed in U.S. Pat. No. 6,431,658, except as explained below. In particular, the hub 20 is a slightly modified version of the front hub disclosed in U.S. Pat. No. 6,431,658, which is designed to be used with the rim 12 having circumferentially equally spaced spoke attachment points. Of course, it will be apparent to those skilled in the art that the rim 12 of the present invention could be coupled to a modified hub that includes rear sprockets, i.e. that is similar to the rear hub disclosed in U.S. Pat. No. 6,431,658, but modified to accommodate the circumferentially equally spaced spoking arrangement disclosed herein. Moreover, it will be apparent to those skilled in the art from this disclosure that the rim 12 with reinforcement members 14 could be modified in order to accommodate such a spoking arrangement or other spoking arrangements as needed and/or desired.

Referring still to FIGS. 18-21, the connections of the spokes 16 and the rim 12 to the hub 20 will now be discussed in more detail. The hub 20 basically includes a tubular hub body portion 84, first and second bearing assemblies 85a and 85b, and a hub axle 86 rotatably supported in the tubular body portion 84 by the bearing assemblies 85a and 85b. The parts of the hub 20 are relatively conventional. Thus, the parts of the hub 20 will not be discussed or illustrated in detail herein.

The tubular body portion 84 has a tubular center portion 87 and a pair of tubular mounting portions 88a and 88b at opposite ends of the center portion 87 for mounting the spokes 16 thereto. Each tubular mounting portion 88a and 88b has a plurality of spoke openings 89a and 89b for coupling the spokes 16 therein, respectively. Preferably, each mounting portion 88a and 88b has eight spoke openings 89a and 89b formed therein, respectively.

Preferably, the second mounting portion 88b is an offset mirror image of first mounting portion 88a. Thus, the spoke openings 89b are preferably circumferentially offset from the spoke openings 89a so that the outer end portions 64 of the spokes 16 are circumferentially equally spaced from each other at the rim 12. The tubular mounting portions 88a and 88b support the spokes 16 in the spoke openings 89a and 89b with the spoke nipples 66.

Second Embodiment

Referring now to FIGS. 22-28, a bicycle wheel 210 in accordance with a second preferred embodiment of the present invention will now be explained. The bicycle wheel 210 is identical to the bicycle wheel 10 of the first embodiment, except that the bicycle wheel 210 is a rear bicycle wheel designed to accommodate sprockets (not shown) and the wheel 210 utilizes twenty (20) spokes 16. Specifically, the wheel 210 uses a modified rim 212 having modified reinforcement members 214a, 214b and 214c bonded thereto, twenty (20) of the spokes 16 arranged in a modified spoking arrangement, and a modified hub 220.

This second embodiment is substantially identical to the first embodiment. Thus, this second embodiment will not be explained and/or illustrated in detail herein. Rather, it will be apparent to those skilled in the art from this disclosure that the descriptions and illustrations of the first embodiment also apply to this second embodiment, except as explained and illustrated herein. Moreover, it will be apparent to those skilled in the art from this disclosure that like reference numerals will be used to describe parts of this second embodiment that are identical or substantially identical to like parts of the first embodiment. Descriptions of these like parts will be omitted for the sake of brevity.

The rim 212 basically includes an outer annular portion 224 and an inner annular portion 226 with the reinforcement members 214a, 214b and 214b coupled thereto at a plurality of attachment openings 228 formed therein. The outer annular portion 224 is identical to the outer annular portion 24 of the first embodiment. The inner annular portion 226 is identical to the inner annular portion 26 of the first embodiment, except the inner annular portion 226 includes twenty (20) circumferentially equally spaced attachment openings 228 and a total of twenty of the modified reinforcement members 214a, 214b and 214b. Each attachment opening 228 has a size and shape identical to the attachment openings 28 of the first embodiment. Thus, the attachment openings 228 are identical to the attachment openings 28 of the first embodiment, except the attachment openings 228 are closer together in the circumferential direction to accommodate the increased number of spokes 16.

The reinforcement members 214a, 214b and 214c are all identical to the reinforcement members 14 of the first embodiment, except the reinforcement members 214a, 214b and 214c are configured to accommodate both radial and tangential spokes 16, which extend from the modified hub 220. In particular, reinforcement members 214a are designed to receive radial spokes 16, the reinforcement members 214b are designed to receive first tangential spokes 16 and the reinforcement members 214c are designed to receive second tangential spokes 16. More specifically, reinforcement members 214a, 214b and 214c have angled tubular sections 252a, 252b and 252c, respectively, to accommodate the spoking arrangement of the hub 220 (i.e., ten radial spokes 16 and ten tangential spokes 16 in an alternating manner). The hub 220 will be explained in more detail below.

More specifically, the rim 212 includes ten (10) of the reinforcement members 214a, five (5) of the reinforcement members 214b and five (5) of the reinforcement members 214c. The reinforcement members 214b and 214c are arranged in an alternating, interlaced manner between the reinforcement members 214a (i.e., 214a, 214b, 214a, 214c, 214a, 214b and so on) about the circumference of the rim 212. The reinforcement members 214a are designed to receive radial spokes 16 in a manner similar to the first embodiment, while the reinforcement members 214b and 214c are designed to receive first and second tangential spokes 16, respectively, in a relatively conventional orientation as explained below with reference to the hub 220.

Figure 24:
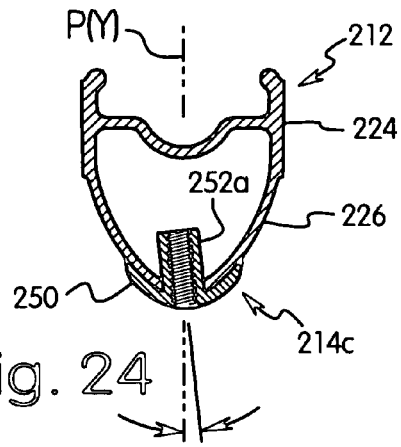
FIG. 24 is an enlarged, partial cross-sectional view of the wheel illustrated in FIG. 22, as viewed along section line 24-24 of FIG. 22.
Figure 25:
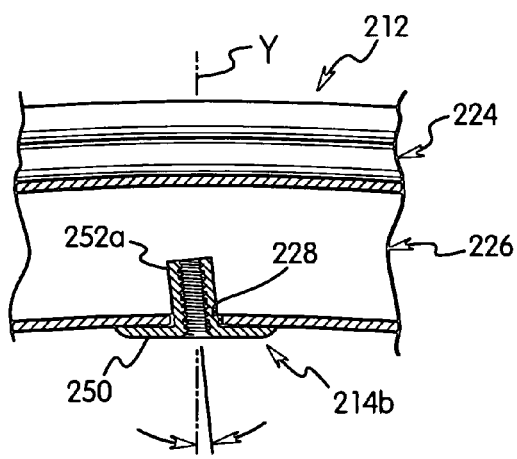
FIG. 25 is an enlarged, axial cross-sectional view of the area of the rim identified by circle 25 in FIG. 22 (i.e., a cross-sectional view as seen along the center plane of the wheel)
Figure 26:
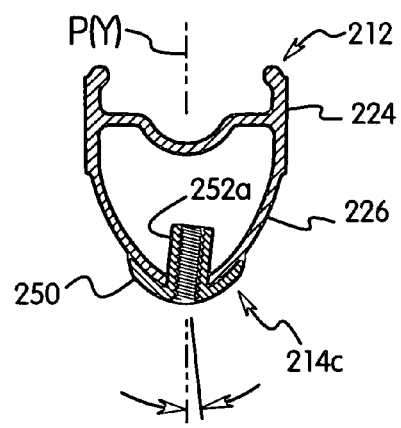
FIG. 26 is an enlarged, partial cross-sectional view of the wheel illustrated in FIG. 22, as viewed along section line 26-26 of FIG. 22.
Figure 27:
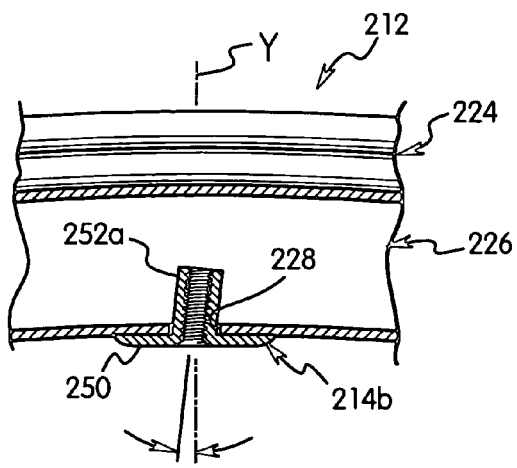
FIG. 27 is an enlarged, axial cross-sectional view of the area of the wheel identified by circle 27 in FIG. 22 (i.e., a cross-sectional view as seen along the center plane of the wheel)
Figure 28:
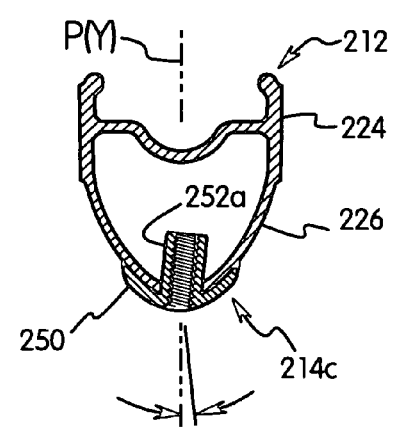
FIG. 28 is an enlarged, partial cross-sectional view of the rim illustrated in FIG. 22, as viewed along section line 28-28 of FIG. 22.

The reinforcement members 214a are identical to each other. In particular, the tubular section 252a of each reinforcement member 214a is preferably angled 0° relative to a radial line Y (FIG. 23) and angled about 4° relative to the center plane P (FIG. 24). The rim 212 has a plurality of radial lines Y extending outwardly from the rotation axis X through the centers of the reinforcement members 214a, 214b and 214c in a manner similar to the first embodiment. The reinforcement members 214b are also identical to each other. The reinforcement members 214b are designed to receive first tangential spokes 16. In particular, the tubular section 252b of each reinforcement member 214b is preferably angled 5° relative to the radial line Y (FIG. 25) and angled about 5° relative to the center plane P (FIG. 26). The reinforcement members 214c are also identical to each other. The reinforcement members 214c are designed to receive second tangential spokes 16. In particular, the tubular section 252c of each reinforcement member 214c is preferably angled 5° relative to the radial line Y (FIG. 27) and angled about 6° relative to the center plane P (FIG. 28). The tubular sections 252b and 252c are angled in opposite directions relative to the radial lines Y as viewed in the axial direction as seen in FIGS. 25-27.

As mentioned above, the bicycle wheel 210 is designed as a rear bicycle wheel. Thus, the wheel 210 preferably includes a free wheel 222 coupled to one end of the center hub 220. The free wheel 222 is coupled to the center hub 220 in a conventional manner. Thus, the free wheel 222 will not be discussed and/or illustrated in detail herein. The bicycle wheel 210 preferably utilizes the spoking arrangement illustrated in FIG. 22 in order to accommodate the free wheel 222. The center hub 220 with the free wheel 222 of the wheel 210 of the present invention is relatively conventional, except as explained and illustrated herein. Thus, the center hub 220 will not be discussed and/or illustrated in detail herein. Rather, the center hub 220 can basically be understood from U.S. Pat. No. 6,431,658, assigned to Shimano Inc.

Specifically, the center hub 220 of the present invention is similar to the rear hub disclosed in U.S. Pat. No. 6,431,658, except the center hub 220 of the present invention utilizes more spokes (i.e., twenty spokes) that are circumferentially equally spaced apart at the rim 212, and that the radial spokes 16 of the present invention are mounted to the center hub 220 adjacent the free wheel 222.

More specifically, the center hub 220 of the present invention is similar to the hub utilized with Shimano's wheel model Nos. WH-M535 and WH-R535, except the center hub 220 of the present invention is designed to have twenty (20) spokes 16 coupled thereto that are equally circumferentially spaced about the rim 212. Shimano's wheel model Nos. WH-M535 and WH-R535 are designed to have sixteen spokes coupled thereto in paired spoking arrangements at their rims. Thus, it will be apparent to those skilled in the art from this disclosure that the center hub 220 of the wheel 210 of the present invention has a tubular spoke attachment portion (adjacent the free wheel 222) with ten slots for coupling the ten spokes 16 therein, and five spoke attachment projections (at the opposite end from the freewheel 222) with each designed to have one of the first tangential spokes 16 and one of the second tangential spokes 16 coupled thereto via the spoke nipples 66. The spokes 16 can be identical to each other. However, some of the spokes 16 can be longer if needed, in order to be optimally used with the center hub 220.

It will also be apparent to those skilled in the art from this disclosure that such spoke attachment projections and the slots of the tubular spoke attachment portion of the center hub 220 should be arranged relative to each other such that the spokes 16 are coupled to the rim 212 at circumferentially equally spaced locations. In any case, the precise construction of the hub 220 of the wheel 210 of the present invention is not critical so long as the spokes 16 can be coupled thereto via the spoke nipples 66 at the orientations (inclinations) disclosed herein.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rim comprising:
    an annular tire attachment portion adapted to have a tire mounted thereon;
    an annular spoke attachment portion fixedly coupled with the tire attachment portion, the spoke attachment portion including an interior surface, a pair of annular side sections and an inner annular section to form a substantially U-shaped cross-sectional shape with an annular hollow area, the spoke attachment portion further including a plurality of circumferentially spaced attachment openings with each of the attachment openings having a central axis extending therethrough; and
    a plurality of reinforcement members with each reinforcement member having a base section and a tubular section with internal threads formed as a one-piece unitary member with the base section, the base sections being fixedly bonded to the spoke attachment portion at the attachment openings to effectively increase the thickness of the spoke attachment portion of the rim at the attachment openings without forming a through hole in areas of the annular spoke attachment portion that surround the attachment openings, the tubular sections extending from the base sections through the attachment openings into the annular hollow area, each of the reinforcement members being free from contact with the interior surface of the annular spoke attachment portion,
    each of the base sections including:
        a rim facing surface contacting an outer surface of the spoke attachment portion of the rim,
        an exterior facing surface facing in an opposite direction from the rim facing surface with the exterior facing surface being free of a cylindrical projection extending from the exterior facing surface in an inner radial direction, and
        a through opening that is aligned with one of the attachment openings and a bore of one of the tubular sections.

2. The bicycle rim according to claim 1, wherein
each of the reinforcement members is bonded by melting metal to form a bond between the outer surface of the spoke attachment portion of the rim and the base section.

3. The bicycle rim according to claim 2, wherein
the bond between the outer surface of the spoke attachment portion of the rim and each of the base sections is formed by brazing.

4. The bicycle rim according to claim 3, wherein
each of the reinforcement members has an annular peripheral edge defined by the base section that defines a step between the base section and the outer surface of the spoke attachment portion.

5. The bicycle rim according to claim 4, wherein
the annular peripheral edges of the reinforcement members include a tapering part and a radial part.

6. The bicycle rim according to claim 1, wherein
each of the reinforcement members has an annular peripheral edge defined by the base section that defines a step between the base section and the outer surface of the spoke attachment portion.

7. The bicycle rim according to claim 6, wherein
the annular peripheral edges of the reinforcement members include a tapering part and a radial part.

8. The bicycle rim according to claim 1, wherein
the rim facing surface of each of the reinforcement members has a U-shaped contour as viewed along a circumferential direction of the rim to match an exterior contour of the outer surface of the spoke attachment portion.

9. The bicycle rim according to claim 3, wherein
each of the reinforcement members has an annular peripheral edge defined by the base section that defines a step between the base section and the outer surface of the spoke attachment portion.

10. The bicycle rim according to claim 1, wherein
the attachment openings are formed in an inner annular section such that the central axes of the attachment openings extend in generally a radial direction of the rim.

11. The bicycle rim according to claim 1, wherein
the tire attachment portion includes an annular bridge section extending between a pair of annular tire support sections to form a substantially U-shaped cross-sectional shape, the spoke attachment portion being fixedly coupled to the tire attachment portion to form an annular hollow area therebetween.

12. The bicycle rim according to claim 11, wherein
the annular bridge section is free of openings except for a single valve aperture formed therein.

13. The bicycle rim according to claim 1, wherein each of the reinforcement members has a maximum overlapping dimension overlapping the annular spoke attachment portion as measured from an outer peripheral edge to a respective one of the attachment openings with the maximum overlapping dimension being at least half as large as a maximum transverse dimension of the attachment openings.

* * * * *